United States Patent
Hayashi et al.

(10) Patent No.: US 7,827,287 B2
(45) Date of Patent: Nov. 2, 2010

(54) INTERIM EXECUTION CONTEXT IDENTIFIER

(75) Inventors: Hideaki Hayashi, San Mateo, CA (US); Rajesh Nanda, French Camp, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1082 days.

(21) Appl. No.: 11/057,728

(22) Filed: Feb. 14, 2005

(65) Prior Publication Data

US 2006/0184677 A1     Aug. 17, 2006

(51) Int. Cl.
    *G06F 15/16*     (2006.01)
(52) U.S. Cl. .................................. 709/227; 709/229
(58) Field of Classification Search ............... 709/227
    See application file for complete search history.

(56) References Cited

U.S. PATENT DOCUMENTS

| | | | |
|---|---|---|---|
| 6,961,776 B1 * | 11/2005 | Buckingham et al. | 709/229 |
| 7,392,060 B2 * | 6/2008 | Kilian-Kehr et al. | 455/552.1 |
| 2003/0200212 A1 * | 10/2003 | Benson et al. | 707/7 |
| 2005/0091383 A1 * | 4/2005 | Bender et al. | 709/228 |
| 2008/0086564 A1 * | 4/2008 | Putman et al. | 709/227 |

\* cited by examiner

*Primary Examiner*—George C Neurauter, Jr.
*Assistant Examiner*—Mark D Fearer
(74) *Attorney, Agent, or Firm*—Park, Vaughan, Fleming & Dowler LLP

(57) ABSTRACT

A system and method for identifying a communication connection with an interim identifier prior to recognition of an original or previous identifier received via the connection. A first server or server process receives a service request (e.g., for an application, a web page or other data), and associates an original identifier with the request via one or more log entries. The request is forwarded to a second server or server process for additional or final processing. The second server associates an interim identifier with the communication connection established to receive the service request from the first server. The interim identifier is logged with one or more events associated with establishment of the connection and/or receipt and processing of the service request. When the original identifier is read and recognized, the interim identifier is bridged or mapped to the original identifier via a distinct log entry.

7 Claims, 3 Drawing Sheets

INTERIM EXECUTION CONTEXT IDENTIFIER

BACKGROUND

This invention relates generally to the field of computer systems. More particularly, an interim execution context identifier is provided for identifying computer operations prior to assignment or availability of a normal execution context identifier.

Execution context identifiers, session identifiers and other types of identifiers are often used to help identify and track computer operations. Web servers, application servers, data servers and other types of computer servers often perform operations on behalf of multiple clients concurrently. Thus, on one server there may exist multiple contexts of execution of a server process at one time, with various activities taking place in different contexts.

After a server receives a service request from a client, the server may associate an execution context identifier (ECID) with the request. Thereafter, as various operations or events are performed on behalf of the request, those events may be logged and the ECID may be recorded to associate the event with the request. The resulting log allows the flow of execution or processing of the request to be tracked and analyzed. Illustratively, if an error occurs during some server processing, the log may be used to locate, analyze or rectify the error.

An ECID assigned to a client request by one server process may be passed to a subsequent server process for additional processing on behalf of the request. However, the second process cannot identify and use the ECID until the request is received and parsed. If an error occurs prior to acquisition of the ECID (e.g., while the request is being received) by the second process, the ECID cannot be logged. Any subsequent attempt to track or diagnose the error will fail, as it cannot be correlated with any specific context or request.

SUMMARY

In one embodiment of the invention, a system and methods are provided for identifying a communication connection with an interim identifier prior to recognition of an original or previous identifier received via the connection.

In this embodiment, a first server or server process receives a service request (e.g., for an application, a web page or other data), and associates an original identifier with the request via one or more log entries. The request is forwarded to a second server or server process for additional or final processing.

The second server associates an interim identifier with the communication connection established to receive the service request from the first server. The interim identifier is logged with one or more events associated with establishment of the connection and/or receipt of the service request after the connection is established. When the original identifier is read and recognized, the interim identifier is bridged or mapped to the original identifier via a distinct log entry.

The servers or server processes may execute on the same or different computer systems.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, an interim execution context identifier (ECID) is provided for correlating with a particular execution context those activities or events that are performed or that occur on behalf of the context. Distinct execution contexts may correspond to different client sessions or requests. Thus, the use of an interim ECID improves the ability to track the flow of execution or processing of a context.

Figure 1:
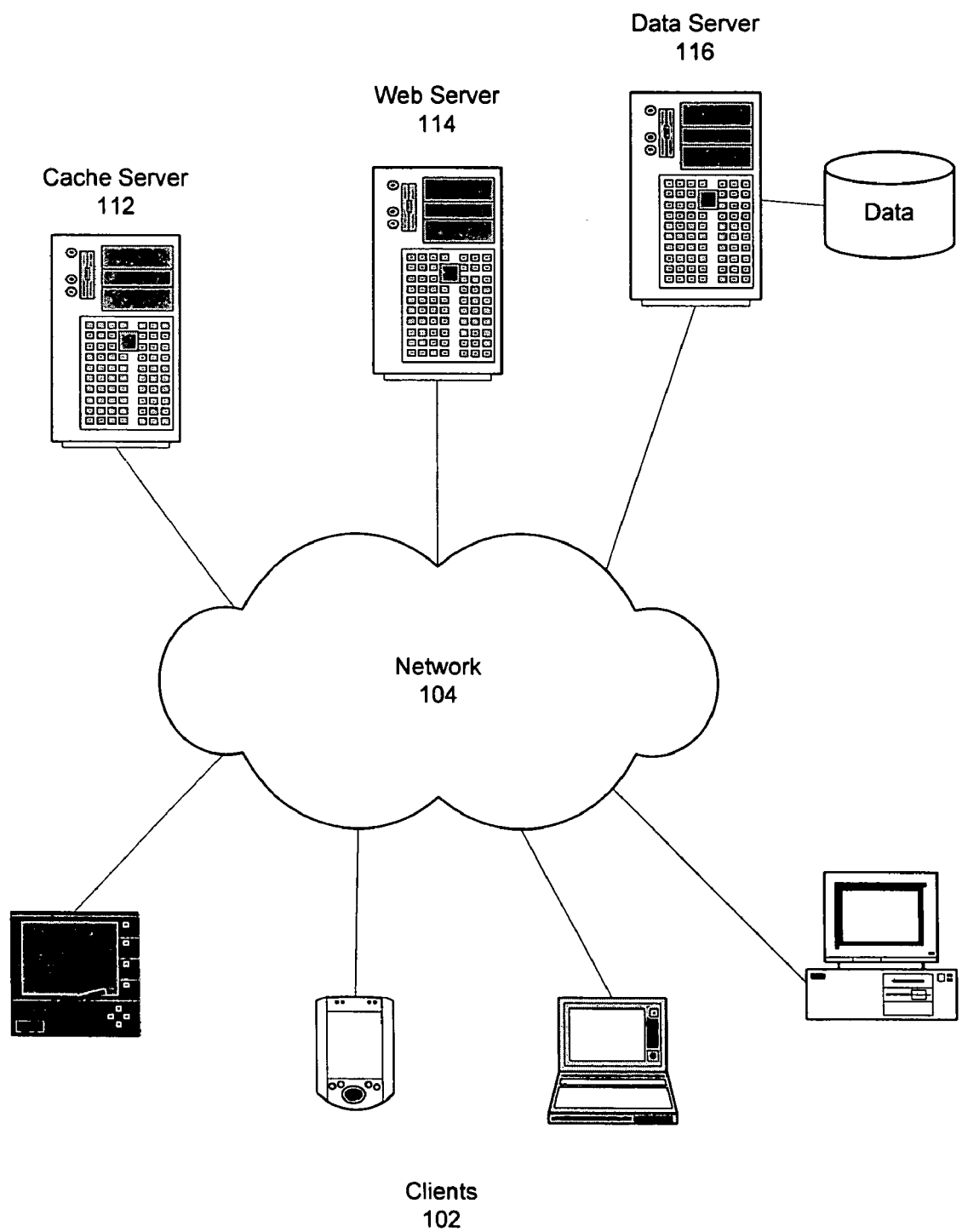
FIG. 1 depicts a computing environment in which an embodiment of the present invention may be implemented.

FIG. 1 depicts an illustrative computing environment in which an embodiment of the invention may be implemented. In this environment, users operate clients 102, which may include various types of computing and communication devices, including notebook and desktop computers, personal digital assistants, smart phones, and so on.

The environment also includes any number of servers, such as cache server 112, web server 114 and data server 116. Each server is configured to receive and process requests, from clients 102 and/or other servers.

In particular, data server 116 is configured to serve data (e.g., from a database) through web server 114. Cache server 112 is configured to cache data served from web server 114 and/or data server 116. Each of servers 112, 114, 116 maintains one or more logs (e.g., event logs) in which activities and events relating to client service requests are logged. In other computing environments, the servers of FIG. 1 may be replaced by separate server processes, which may operate on the same or different computer servers.

In FIG. 1, clients and servers are interconnected via communication links, including network 104, which may comprise the Internet. A client (or another server) may also or instead be coupled to a server via a direct communication link. Communication links may include wired and/or wireless connections.

In the environment depicted in FIG. 1, a client request for data stored on or managed by data server 116 may be initially received by cache server 112. If a valid copy of the requested data is cached on server 112, it is served. If the requested data are not available on cache server 112, the request is forwarded to web server 114. Web server 114 may then forward the request to, or otherwise retrieve requested data from, data server 116.

In an embodiment of the invention, an ECID is associated with a client service request by the server that first receives or handles the request. Thus, when a new service request is received by cache server 112, that server assigns an ECID. If the cache server cannot satisfy the request, the service request and the ECID are forwarded to web server 114 and possibly on to data server 116. When a server assigns or receives an ECID for a request, it logs subsequent activity or events pertaining to that request with the ECID.

In this embodiment, interim or temporary ECIDs are used to ensure that all activity relating to a service request is logged, including the establishment of a communication connection at a server for receiving the request, receipt of the service request, parsing of the request, etc.

An interim ECID may have the same or different form or pattern as a "normal" ECID (e.g., size, alphabetical and/or numerical pattern), but is interim or temporary in that it is only used until the service request's normal ECID is obtained.

For example, when a connection request is received at web server 114 from cache server 112 (or at data server 116 from either web server 114 or cache server 112), the receiving server automatically generates an interim ECID for the connection. The interim ECID is logged with the connection request event and ensuing activity (e.g., receipt of the connection request, establishment of connection, receipt of forwarded service request, parsing of service request).

After the service request is received and parsed, and the "normal" ECID of the request is learned, the interim ECID and normal ECID are bridged via a special log entry. Thereafter, the normal ECID is logged with any subsequent activity.

In another embodiment of the invention, the server that initially receives a new service request from a client (e.g., cache server 112, web server 114) may also generate interim ECIDs, or may generate normal ECIDs for every such connection request. If a normal ECID is generated for a connection that ends up being used for a communication relating to an existing service request that already has an ECID, the new ECID may be dropped in favor of the existing ECID (and bridged to that existing ECID via a log entry).

If, instead, interim ECIDs are generated for all client connections, an interim ECID may be replaced by, and bridged to, a normal ECID generated if and when the communication is recognized as a new service request. If the connection is not used for a new service request (e.g., it is used for a communication relating to an existing service request that already has an ECID), the interim ECID may be bridged to an existing ECID corresponding to that client.

Figure 2:
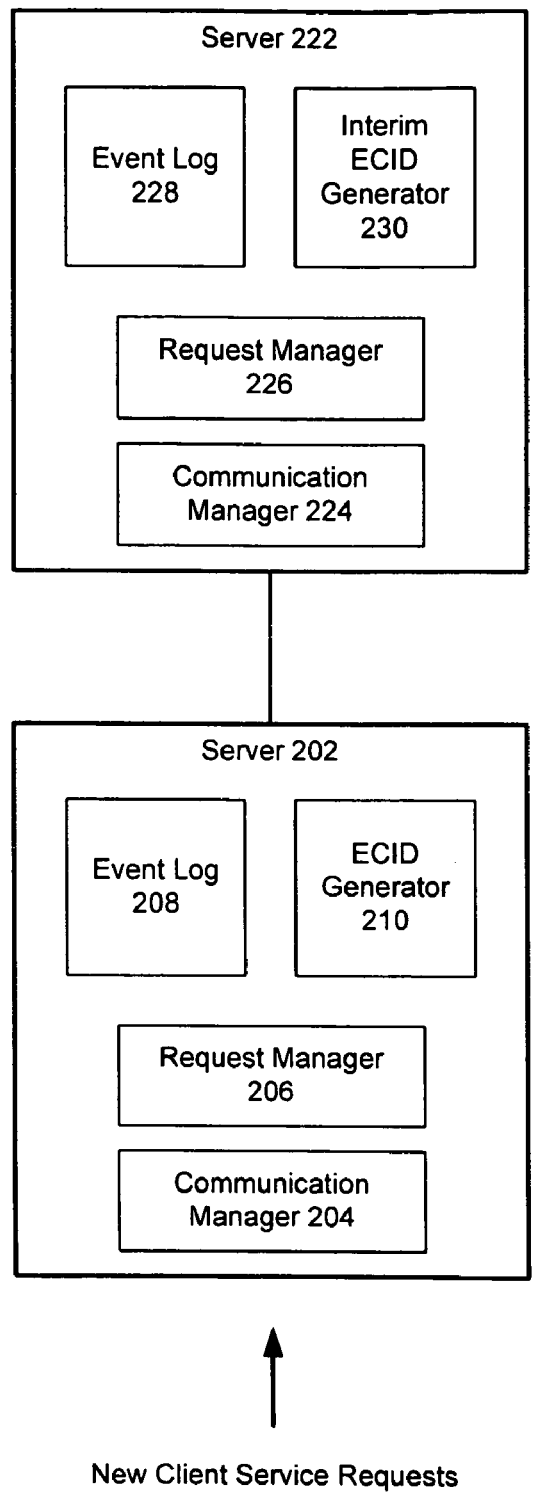
FIG. 2 is demonstrating the use of an interim ECID, according to one embodiment of the invention.

FIG. 2 is a block diagram of two servers (or server processes), in which interim ECIDs are used for temporary identification of an execution context, according to one embodiment of the invention. Server (or server process) 202 is configured to receive new service requests from clients, and may therefore correspond to cache server 112 or web server 114 of FIG. 1. Server (or server process) 222 is configured to perform additional or alternative processing that server 202 cannot.

In this embodiment of the invention, server 202 includes a memory, communication manager 204, request manager 206, event log 208 and ECID generator 210. Server 222 similarly includes communication manager 224, request manager 226, event log 228 and interim ECID generator 230. Server 202 and/or server 222 are coupled via any suitable type of communication link (e.g., wired, wireless, direct, network) and may include various additional components not depicted in FIG. 2.

In the illustrated embodiment of the invention, a Communication Manager may comprise a TCP (Transport Control Protocol) listener (or other listener), a communication interface such as a network interface card or modem, and/or other components for receiving and establishing communication connections. A Request Manager includes logic for receiving, recognizing and parsing a service request, and for extracting any ECID included in the request. The Request Manager may receive the service request via HTTP (HyperText Transport Protocol), FTP (File Transfer Protocol) or some other suitable protocol. An event log is configured to store information for tracking the processing of service requests and/or other activity or events occurring on a server.

ECID generator 210 comprises logic for generating execution context identifiers for new client service requests and associating them with the requests. Interim ECID generator 230 comprises logic for generating interim execution context identifiers for communication connections received at server 222 from server 202 and/or other servers. The ECIDs may have virtually any forms or formats.

Figure 3:
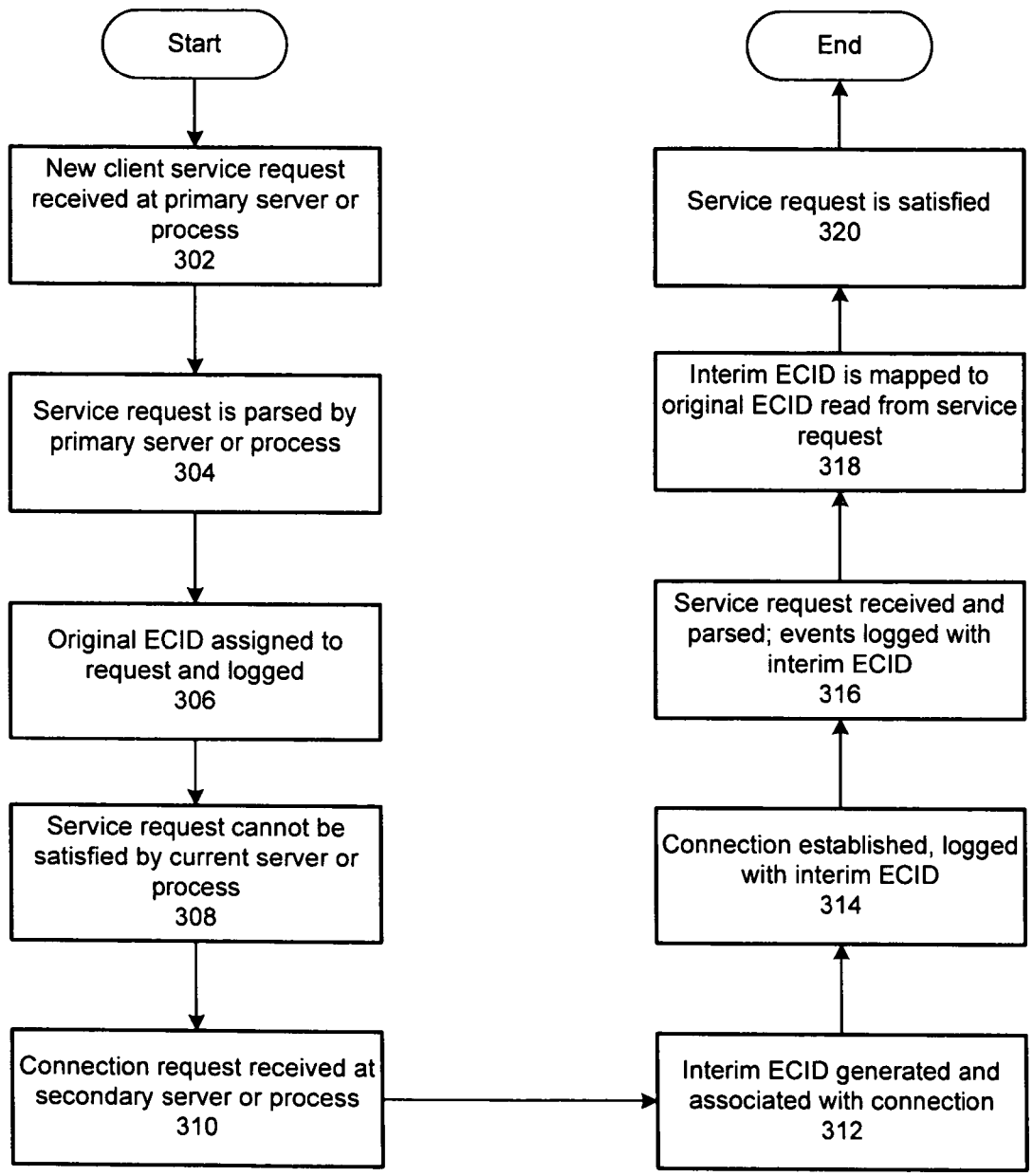
FIG. 3 is a flowchart illustrating one method of employing an interim execution context identifier, in accordance with an embodiment of the invention.

FIG. 3 demonstrates a method of using an interim ECID, according to one embodiment of the invention. This method is described in conjunction with the block diagram of FIG. 2.

In operation 302, a new client service request is received at server 202, via a direct or indirect (e.g., network) communication connection, by communication manager 204. The service request may comprise a request for data, an update to existing data, or any other type of processing request a server may be configured to perform on behalf of a client.

In operation 304, request manager 206 receives and parses the request, and recognizes it as a service request. The request manager may also parse the request to determine if it includes an ECID. In this example, the service request does not include an ECID because it is a new request.

In operation 306, ECID generator 210 generates an "original" or "normal" ECID for the new service request and logs the ECID in event log 208. Any or all of the other activity described here and performed on server 202 may also be logged in the event log.

In particular, server 202 may activity related to receipt and handling of the service request. For example, server 202 may log the establishment of a communication connection with the client, the reading or receipt of the service request, parsing of the service request, creation of a cache key, a cache lookup, a cache miss, forwarding of the request to server 222, etc.

In one alternative embodiment of the invention, an ECID is assigned by server 202 when it receives a connection from the client. That ECID may become the original or normal ECID associated with the new request.

In operation 308, server 202 determines that it cannot satisfy the request. Illustratively, server 202 may be a cache server and the request may be a request for data that are not stored on the server. Or, the request may comprise a request for use of some other resource not available on the server.

In operation 310, server 222 (e.g., communication manager 224), which may be able to satisfy the service request because it has or has access to the requested data or other necessary resource, receives a connection request from server 202 (e.g., communication manager 204).

In operation 312, interim ECID generator 230 generates and logs an interim ECID in event log 228, for association with the communication connection.

Any or all of the activity described here and performed on server 222 may be logged in event log 228 (with the interim ECID). As a result, if the connection request or the client request encounters a problem before the client request is retrieved and parsed by request manager 226, the event log may facilitate error detection and correction. In particular, establishment of the communication connection and the reading and parsing of the service request received via the connection may be logged in association with the interim ECID.

In operation 314, the connection is established, which may entail handshaking, protocol negotiation and/or other activity. For example, server 222 may perform any necessary security authentication on the request or server 202, the connection request may be examined for form or syntax, etc.

In operation 316, the client service request is read and parsed by request manager 226. In addition, the ECID (the original or normal ECID) assigned by server 202 is retrieved from the service request. As described above, the reading and/or parsing operations may be logged with the interim ECID.

In operation 318, server 222 (e.g., request manager 226) makes a special log entry to associate the interim ECID with the original ECID. Thereafter, any further logging on server 222 relating to this request for this communication connection (e.g., retrieval of data, generation of a web page, service of the web page) will be logged with the original ECID.

In operation 320, normal processing of the client request is conducted, which may entail retrieving or storing data, returning a response to server 202 and returning a response to the client.

Other embodiments of the invention may be employed to associate interim identifiers with things other than execution contexts. Such interim identifiers may be used, for example, for client sessions, communication connections for purposes other than client service requests, etc.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A method of using an interim execution context identifier, the method comprising:
   receiving at a second server from a first server a request for a communication connection, wherein the first server assigns an original identifier to a service request which the first server forwards to the second server to process, and wherein the first and second servers execute on separate computer systems among a cluster of servers;
   generating an interim identifier associated with the communication connection;
   logging one or more activities associated with the received request using the interim identifier;
   receiving the service request via the communication connection, wherein the service request comprises the original identifier;
   parsing the service request to retrieve the original identifier;
   logging a log entry to associate the interim identifier with the original identifier; and
   responsive to the original identifier being retrieved, logging one or more activities associated with the service request using the original identifier.

2. The method of claim 1, further comprising:
   logging said interim identifier in association with said receiving the service request and said parsing the service request.

3. The method of claim 1, wherein:
   the first server comprises a first server process that receives service requests; and
   the second server comprises a second server process that receives service requests.

4. The method of claim 1, wherein the first server and the second server execute on a single computer system.

5. A non-transitory computer-readable storage medium storing instructions that, when executed by a computer, cause the computer to perform a method of using an interim execution context identifier, the method comprising:
   receiving at a second server from a first server a request for a communication connection, wherein the first server assigns an original identifier to a service request which the first server forwards to the second server to process, and wherein the first and second servers execute on separate computer systems among a cluster of servers;
   generating an interim identifier associated with the communication connection;
   logging one or more activities associated with the received request using the interim identifier;
   receiving the service request via the communication connection, wherein the service request comprises the original identifier;
   parsing the service request to retrieve the original identifier;
   logging a log entry to associate the interim identifier with the original identifier; and
   responsive to the original identifier being retrieved, logging one or more activities associated with the service request using the original identifier.

6. A non-transitory computer-readable storage medium containing a data structure configured for logging events of a server, the data structure comprising:
   a first set of log entries comprising one or more activities associated with a request for a communication connection from a first server to a second server, wherein each entry in the first set of log entries comprises an interim identifier generated by the second server to associate with the communication connection, and wherein the first and second servers execute on separate computer systems among a cluster of servers;
   a second set of log entries comprising one or more activities associated with a service request which the first server forwards to the second server to process via the communication connection, wherein each entry in the second set of log entries comprises an original identifier assigned to the service request by the first server; and
   a bridge log entry configured to associate said interim identifier with said original identifier,
   wherein the first set of log entries is logged prior to retrieval of the original identifier from the service request, and wherein the second set of log entries is logged after the retrieval of the original identifier from the service request.

7. A computer system for processing service requests, the computer system comprising:
   a memory;
   a communication manager configured to receive a request for a communication connection at a second server from a first server, wherein the first and second servers execute on separate computer system among a cluster of servers;

a generator configured to generate an interim identifier associated with the communication connection;

a request manager configured to parse a service request which the first server forwards to the second server to process via the communication connection, wherein the service request comprises an original identifier assigned by the first server;

a log configured to store a first set of log entries comprising one or more activities associated with the request for the communication connection, wherein each entry in the first set of log entries comprises the interim identifier, a second set of log entries comprising one or more activities associated with the service request, wherein each entry in the second set of log entries comprises the original identifier, and a bridge log entry configured to associate the interim identifier with the original identifier.

* * * * *